United States Patent [19]

Brandle

[11] Patent Number: 4,586,158

[45] Date of Patent: Apr. 29, 1986

[54] SCREEN MANAGEMENT SYSTEM

[75] Inventor: Richard T. Brandle, Dallas, Tex.

[73] Assignee: International Business Machines Corp., Armonk, N.Y.

[21] Appl. No.: 468,515

[22] Filed: Feb. 22, 1983

[51] Int. Cl.[4] ........................ G06F 3/153; G09G 1/00

[52] U.S. Cl. .................................... 364/900; 340/723; 364/300

[58] Field of Search ... 364/200 MS File, 900 MS File, 364/300, 518, 521; 340/747, 286 M, 727, 745, 750, 723, 731, 734

[56] References Cited

U.S. PATENT DOCUMENTS

| | | | |
|---|---|---|---|
| 3,579,197 | 5/1971 | Stapleford | 364/200 |
| 4,121,283 | 10/1978 | Walker | 340/721 |
| 4,330,847 | 5/1982 | Kuseski | 364/900 |
| 4,435,777 | 3/1984 | McCaskill | 340/750 |
| 4,439,761 | 3/1984 | Fleming | 340/747 |
| 4,451,825 | 5/1984 | Hall | 340/750 |
| 4,454,593 | 6/1984 | Fleming | 364/900 |
| 4,463,442 | 7/1984 | Dachowski | 364/900 |

*Primary Examiner*—James D. Thomas
*Assistant Examiner*—Florin Munteanu
*Attorney, Agent, or Firm*—C. Lamont Whitham; Thomas F. Galvin

[57] ABSTRACT

A method of providing efficient on-line and interactive application program utilization of an assortment of devices calling for different screen characteristics. An application programmer writes screen definitions for a particular device to be used. These definitions are stored exterior of the application program and are used to define the quantity, order, and placement of the application program's information on the screen. The application program provides services to generate and process each data element which can be presented. These services are used by a mapping system in conjunction with the screen definition to generate and process a device dependent data stream.

4 Claims, 5 Drawing Figures

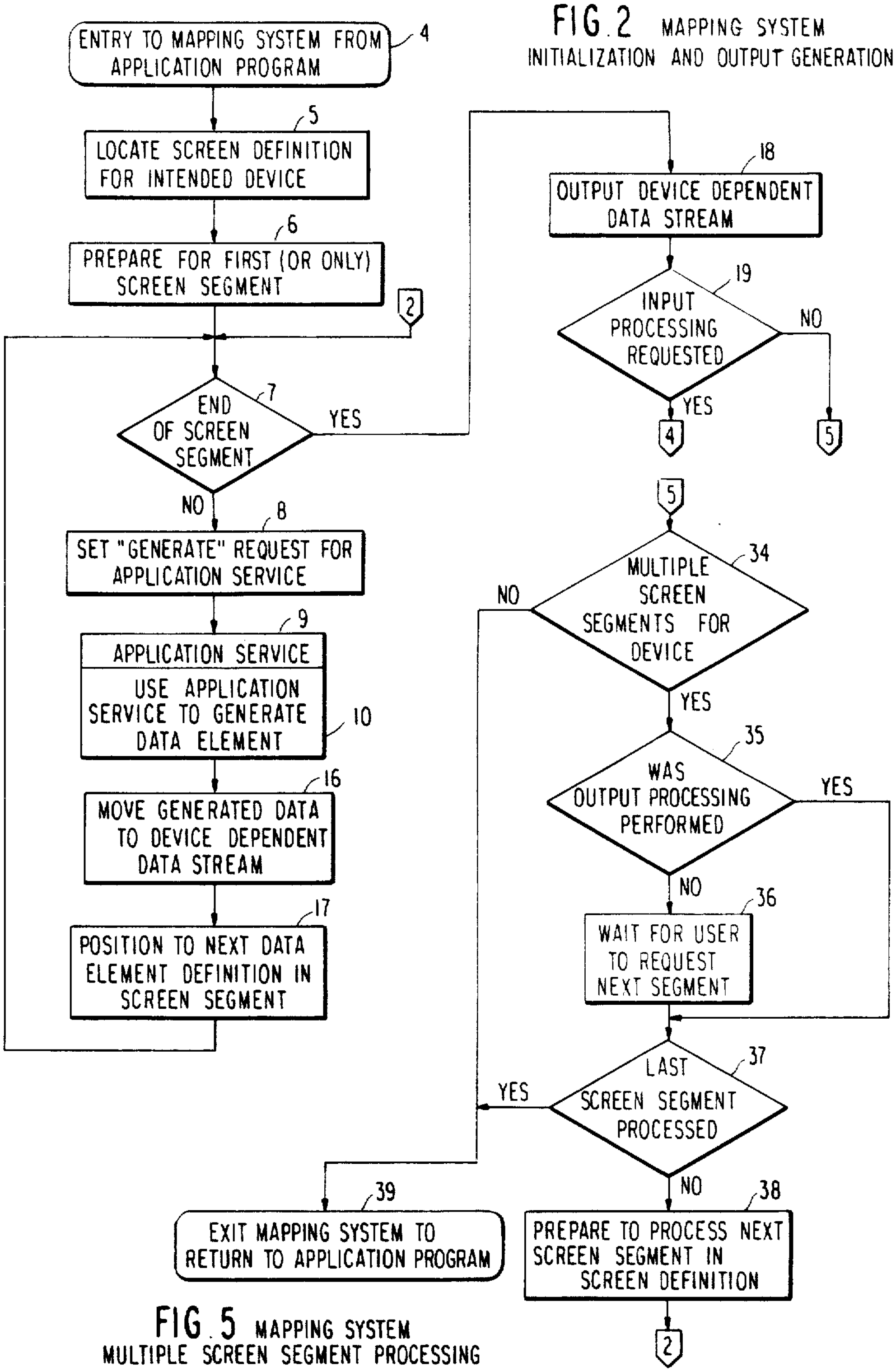
FIG. 2 MAPPING SYSTEM INITIALIZATION AND OUTPUT GENERATION
FIG. 5 MAPPING SYSTEM MULTIPLE SCREEN SEGMENT PROCESSING FIG. 4 MAPPING SYSTEM INPUT PROCESSING
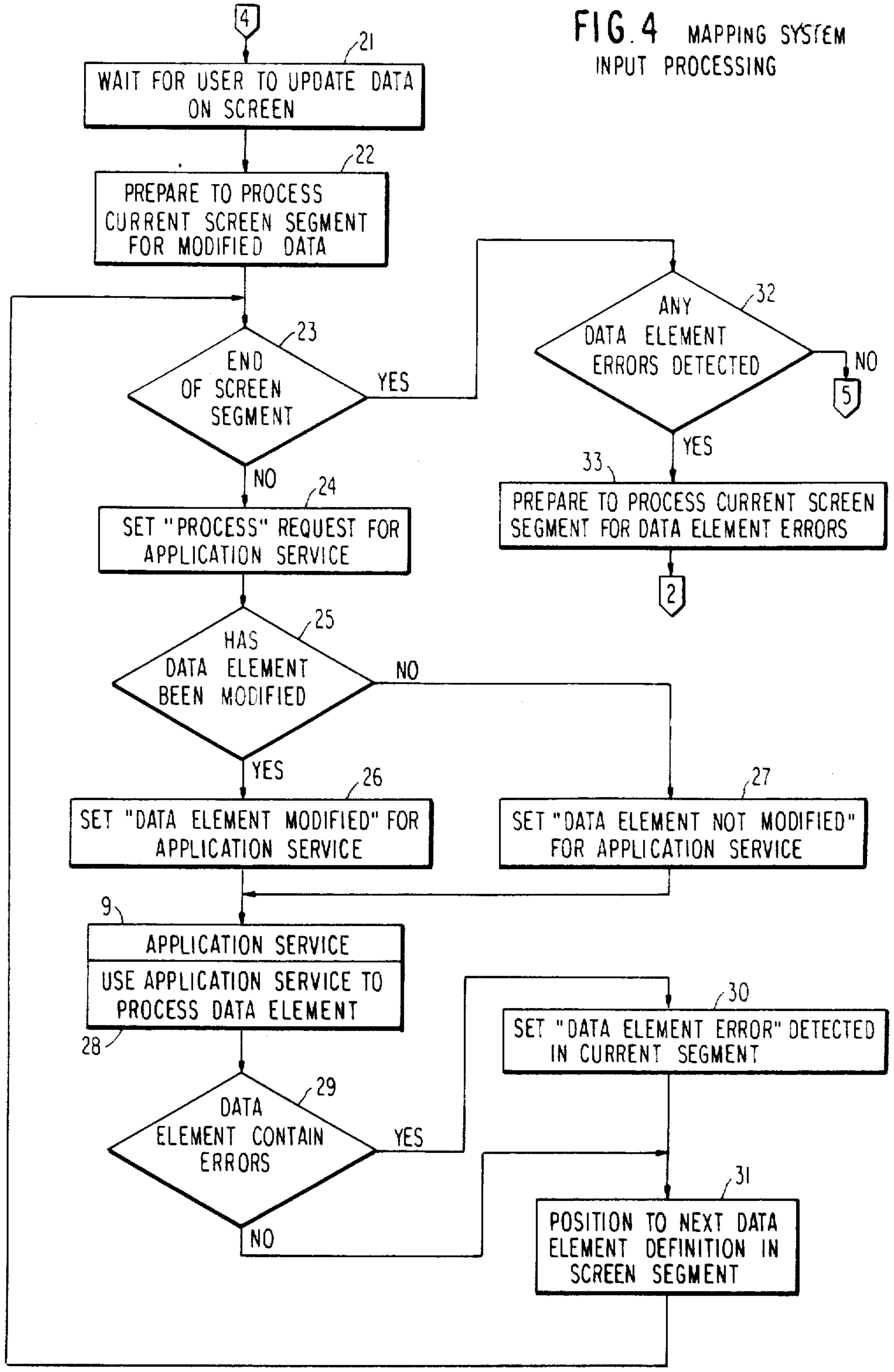

SCREEN MANAGEMENT SYSTEM

DESCRIPTION

1. Technical Field

This invention relates generally to rendering an application program device independent and, more specifically, to an efficient method of providing full on-line and interactive application program utilization of a substantially unlimited assortment of devices calling for differing screen sizes.

2. Background Art

Full and efficient utilization of a wide range of defined and yet-to-be defined devices in an on-line and interactive system has been an elusive goal from an economic, as well as practical standpoint. On-line and interactive is meant to include attended input/output as opposed to, for example, unattended batch output. Existing data processing systems designed to process on-line and interactive applications or application programs have been provided mapping services or systems in an attempt to minimize the problems associated with greatly differing device characteristics, such as display screen dimensions. These problems originated because applications were specific device oriented. That is, and for example, application programs have been written specifically for 25 line by 80 character display devices. Not only is use of a smaller device unlikely, operability is also unlikely. Use of a larger device, such as a 66 line by 100 character display is likely, but considerable screen space would go unused in the case of an application program written specifically for 25 line by 80 character display devices.

A traditional approach in displaying data based on an application program has been to have the application specify the quantity of information to be presented and the mapping service, via programmer defined screen definitions, specify the order and placement of the information on the display screen. The information is divided into fields, and the value of each field is provided to the mapping system in a predetermined order which is a by-product of the screen definition process. Neither more nor less information may be provided by the application program for presentation, though.

The above approach is unsatisfactory from either of two standpoints when a new display device having an unprovided for screen geometry is to be supported. First, if the new screen size is not large enough to hold all of the information being generated by the application program, multiple screens are required for proper presentation. Second, if the new screen size has additional space, this space cannot be utilized because additional information is not available from the application. Neither of these problems can be resolved without modification of the existing application. This is not minor task. In addition, re-testing of the application following modification is generally required to insure that it is still functional with all prior devices as well as newly supported devices. Without time consuming modification and re-testing, monies expended for larger displays is wasted.

The above noted inadequacies of the prior art are overcome in a unique and unobvious manner by the instant invention. More specifically, the instant invention presents an advance in that application programs need no longer be device specific. Further, the instant invention presents an advance in that the application program is no longer a vehicle for determining what information actually appears on a screen.

DISCLOSURE OF THE INVENTION

A unique method of managing screens is provided in order that varying dimensions are readily facilitated. This is accomplished broadly by isolating an application program from the physical presentation of information on a screen. More specifically, an application program calls a mapping service to effect interfacing and two-way communication between the mapping service and application services of the application program. The mapping service in turn provides an output determined by the interfacing and a screen definition. Used is an application program structure where the logic to generate and process each data element to be presented is separated from the main logic of the application. As just pointed out, used in conjunction therewith is the screen definition and the mapping service. The screen definition specifies the order, placement, and quantity of each data element to be presented. The mapping service processes the screen definition and utilizes the data generators and processors of the application to construct and process a device dependent data stream.

BRIEF DESCRIPTION OF THE DRAWING

FIG. 2 is a flow diagram of the initialization and output generation process performed by the mapping service utilized in the method of this invention.

FIG. 4 is a flow diagram of the input processing process performed by the mapping service.

FIG. 5 is a flow diagram of the multiple screen segment processing process performed by the mapping service.

BEST MODE FOR CARRYING OUT THE INVENTION

Figure 1:
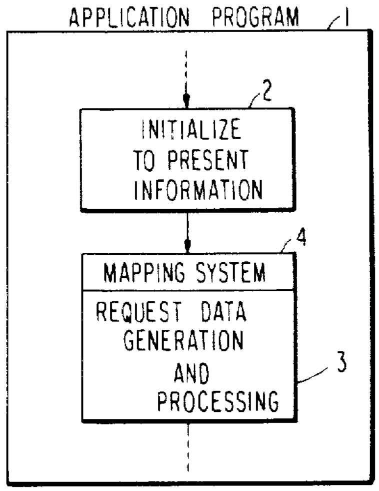
FIG. 1 is a generalized block diagram representing early steps in the use of an application program used according to the method of this invention.

For a more detailed understanding of the invention, reference is first made to FIG. 1. To begin with, an application program denoted by reference numeral 1 initializes any variables necessary to obtain sought data or information. This initialization step, denoted by block 2, can include setting storage values or establishing a position in a data base. However, it is important to note, as will become more readily apparent later herein, that the actual data to be presented is not obtained in this step. After initialization is performed, application 1 requests, as represented by block 3, data presentation via a mapping service or system 4.

Refer next to FIG. 2. The mapping system 4 is program logic which transforms data from one format into another format based on a specified set of rules. In this case, the data is supplied via application services and the rules are supplied via the screen definition. The transformation which takes place takes the data supplied by the application service and changes it to the format required by the intended device. Another transformation takes place when the user modifies the data on the screen, and changes are made to the format needed by the application service for processing. Mapping system 4 determines the type of intended device and locates a previously defined screen definition for that specific device as represented by block 5. The screen definition, which is made up of programmer written code, specifies the rules needed by the mapping system to generate and process a data stream for a specific type of screen. Included within the screen definition are attributes of each field to be presented on a screen. The attributes could include such items as screen position, color, intensity, and physical presentation length. Also included is dependent information. An example would be control sequences required to set the screen position. Further included is background text which is presented on the screen, but not supplied by an application service, and which cannot be altered by a user. Examples are headings and footings, and data element identifier names to guide the user as to the type of data being presented. Yet further included are attributes of a data element and its associated application service. This can be provided in a variety of ways. Both batch and interactive systems exist today to generate screen definitions for existing mapping systems. If no definition is available, the mapping system logically selects a definition whose characteristics most closely match the intended device. Of course, this may not be possible, and if so, an error condition will be indicated.

The mapping system 4 next prepares to process the first or only screen segment within the definition as represented by block 6. Multiple segments can exist if more data is to be presented than can be handled by available space on the physical screen. Since each data element to be presented on the screen is defined with its related screen segment, a test is made by logic block 7 to determine if all data elements have been processed within the segment. If not, an indicator is set as represented by block 8 in order to apprise the application service of the type of request being made. The application service is represented by block 9 and is associated with the current data element which is called upon, as represented by block 10, to generate the data associated with that element.

Figure 3:
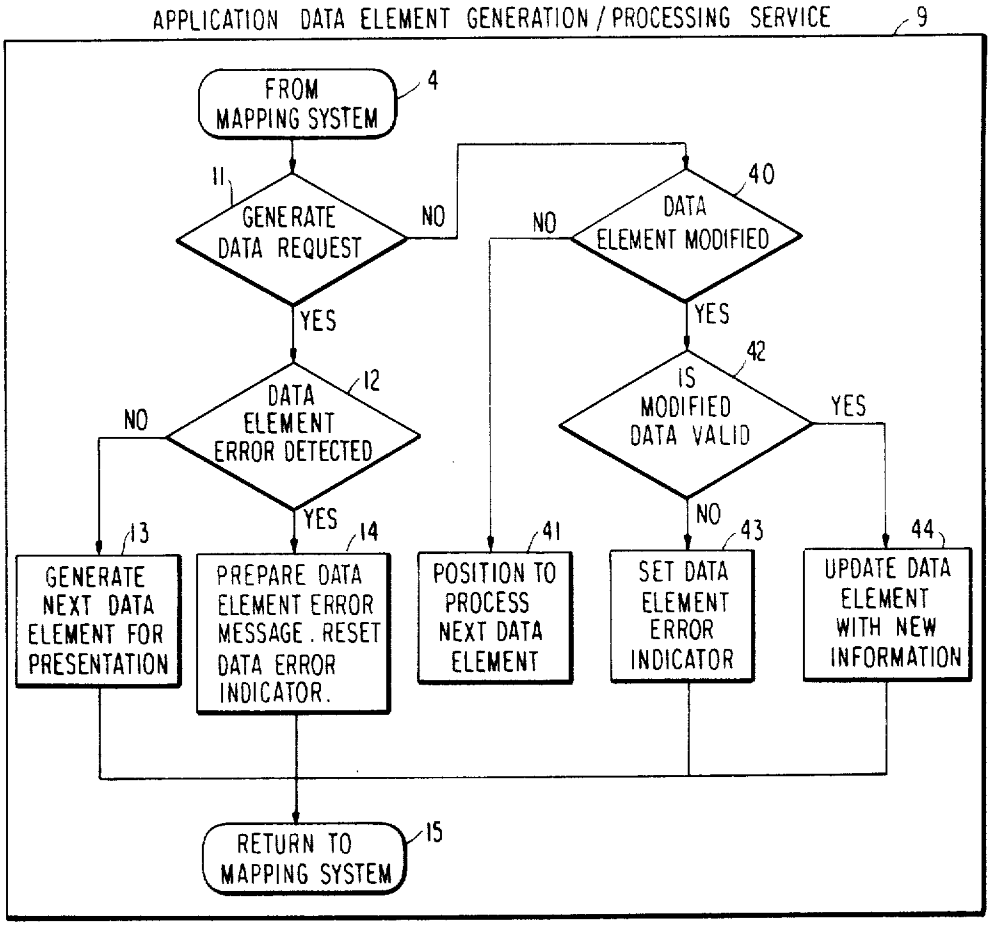
FIG. 3 is a flow diagram illustrating the operation of the application services portion of the method of this invention.

Refer next to FIG. 3. Although the service of this figure has been separated from FIG. 1, it would normally be, both logically and physically, a part of application program 1. The application service 9 determines, by logic block 11, the type of request and whether it is for data generation. A determination is then made by logic block 12 as to whether an error had been detected with this specific data element during previous input processing. If not, new data is generated for presentation, as represented by block 13. Otherwise, an appropriate error message is generated for the data element error, as represented by block 14. This generated information is then returned to the mapping system, as represented by block 15.

Referring again to FIG. 2, the mapping system 4 transfers the generated data to its device dependent data stream, as represented by block 16, and includes other device dependent control information as needed. The next data element definition within the screen segment is obtained, as represented by block 17, and the processing of this new element continues from block 7.

When all data elements within the screen segment have been processed, any final device dependent control information is added to the data stream, as represented by block 18, and this control information is sent to the intended device. If modification of the information is specified in the screen definition, processing continues beginning with block 21 in FIG. 4. Otherwise, processing continues beginning with block 34 in FIG. 5.

Reference is next made to FIG. 4. When input processing is specified in the screen definition as indicated by logic block 19 in FIG. 2, the mapping system 4 waits for the user to enter any new information as indicated by block 21. When entered, the mapping system prepares to process the current screen segment for new information as represented by block 22. A determination is made by logic block 23 to determine if all input data elements have been processed. If not, an indicator is set, as indicated by block 24, in order that the application service 9 will have knowledge of the type of request being made. An additional determination is made by logic block 25 and indicators are set, as represented by blocks 26 and 27 in order for the application service 9 to be notified if any new data was entered for this element. The application service 9 associated with this specific data element is called upon to process the new data as represented by block 28.

Although the application service has been designated by reference numeral 9, and referred to singularly, what is referred to is logic provided by an application programmer to generate and process a specific type of data element which may be presented on a screen. Usually, there will be one service for each type of data presented. Examples of data types are: (1) person's name, (2) telephone number, (3) skill codes, (4) zip codes, etc. It is possible for one application service to generate and process all of the above data as one type. However, this would introduce order dependencies within the data element. In some application programs, this may not be undesirable because of the natural ordering of the data within the type. For example, name, address, city, state, zip code, is a very commonly accepted order. This type of dependency is merely an implementation decision.

Referring again to FIG. 3 and logic block 11, the application service 9 determines the request type and whether it is a processing request. If not a processing request, a determination is made by logic block 40 to determine if the data element was modified by the user. If not, only data positioning is required as indicated by block 41. Otherwise, the new data is validated as indicated by block 42. If incorrect, an error indicator is set as indicated by block 43. If correct, the new data is processed and stored as indicated by block 44. The application service 9 then returns to the mapping system 4, as indicated by block 15.

Referring again to FIG. 4, a determination is made by logic block 29 to determine if the new data contains errors. If so, an internal indicator is set as indicated by block 30. This indicator will cause error field reprocessing later, beginning with logic block 32. The next data element definition within the screen segment is obtained, as indicated by block 31, and processing continues beginning again with logic block 23.

When all data elements have been processed for input, a determination is made by logic block 32 to determine if any input data elements contain errors. If so, preparation to reprocess the screen segment is made as indicated by block 33, and processing continues beginning with logic block 7 in FIG. 2 to output error messages for the invalid data elements. Otherwise, processing continues, beginning with logic block 34 in FIG. 5.

Referring specifically to FIG. 5, if one screen segment exists as determined by logic block 34, all processing is complete and the application resumes, as indicated by block 39, after block 3 in FIG. 1. Otherwise, multiple screen segments must be presented. A determination is made by logic block 35 to determine if the user was allowed to modify the data. If so, then no waiting is required. Otherwise, the mapping system waits for the user to request the next segment, as indicated by block 36. A determination is next made by logic block 37 to determine if all segments have been presented. If so, the application resumes, as indicated by block 39, after block 3 in FIG. 1. Otherwise, preparation is made for the next screen segment and processing continues beginning with block 7 in FIG. 2.

The primary difference between the mapping systems of the prior art and the mapping system of this invention is the function indicated by block 10 in FIG. 2 and block 28 in FIG. 4. The use of an application service at this point to dynamically obtain data to be presented, or process data which is modified, is new. In the prior art an unvariable quantity of information would be passed to the mapping system at the function point represented by block 3 in FIG. 1. Hence, the quantity of information to be presented would be fixed by the application program, and not the intended device characteristics. Likewise the amount of information which can be accepted would also be fixed.

The application program contemplated with this invention is substantially different from the prior art in that application services used by the mapping system are embedded in, or form an integral part of the main logic of the application program. In the prior art, all information generation takes place prior to the function represented by block 3 in FIG. 1, and all information processing takes place after this function. There is no interaction between the application and the mapping system after the function of block 3 is performed. An additional disadvantage of the prior art is that user errors are not detected until all screen segments have been processed and the application program validates the information after the point of block 3.

In summary, a unique method of managing screens is provided in order that varying dimensions are readily facilitated. This is accomplished broadly by isolating an application program from the physical presentation of information on a screen. More specifically, used is an application program structure where the logic to generate and process each data element to be presented is separated from the main logic of the application. Used in conjunction therewith are a screen definition and a mapping service. The screen definition specifies the order, placement, and quantity of each data element to be presented. The mapping service processes the screen definition and utilizes the data generators and processors of the application to construct and process a device dependent data stream.

While the invention has been particularly shown and described with reference to a preferred embodiment, it will be understood by those skilled in the art that various changes in form and detail may be made without departing from the spirit and scope of the invention.

I claim:

1. A method of structuring a screen management system for variable output wherein an application program can present as much information as possible on any video display device without specifiying display geometry or adjusting for said geometry in said application program, said screen management system including a mapping service which accesses the screen definition for an intended video display device and said application program including application services, said method comprising the steps of:
   - establishing a dialog between said mapping service and said application services; and
   - using said application services by said mapping service to generate a device dependent data stream such that a maximum quantity of information is generated and processed for display on said intended video display device based on said screen definition which specifies the quantity, order and placement of the application program's information on the screen.

2. The method of structuring a screen management system as recited in claim 1 wherein the step of establishing a dialog between said mapping service and said application services comprises the steps of:
   - requesting, by said application program, data presentation to said intended video display device by said mapping service; and
   - requesting, by said mapping service, data generation or processing by said application services.

3. The method of structuring a screen management system as recited in claim 2 wherein the step of using said application services by said mapping service comprises the steps of:
   - responding to a request for data presentation by accessing said screen definition and setting a generate request for application service;
   - generating by said application services a data element for presentation;
   - receiving the generated data element and associating said data element with device dependent information in a screen segment to generate a video display device dependent data element, and repeating the setting, generating, receiving and associating steps until the last screen segment is processed whereby said device dependent data stream is generated;
   - outputing said video display device dependent data stream to a video display device; and
   - exiting said mapping service to return to said application program if there is no input processing requested from the video display device.

4. The method of structuring a screen management system as recited in claim 3 further comprising the steps of:
   - testing for requested input processing of a data element at the end of each screen segment;
   - if input processing is requested, setting a process request for application service;
   - processing by said application services the data element for which processing is requested; and
   - receiving an indication from said application services whether the processed data element is acceptable until the end of the screen segment.

* * * * *